Nov. 7, 1950          B. H. BRISTOL          2,528,735

INSTRUMENT CASE CONSTRUCTION

Filed Aug. 21, 1946          4 Sheets-Sheet 1

INVENTOR
BENJAMIN H. BRISTOL
BY
Blair, Curtis + Hayward
ATTORNEYS

Nov. 7, 1950     B. H. BRISTOL     2,528,735
INSTRUMENT CASE CONSTRUCTION
Filed Aug. 21, 1946     4 Sheets-Sheet 2
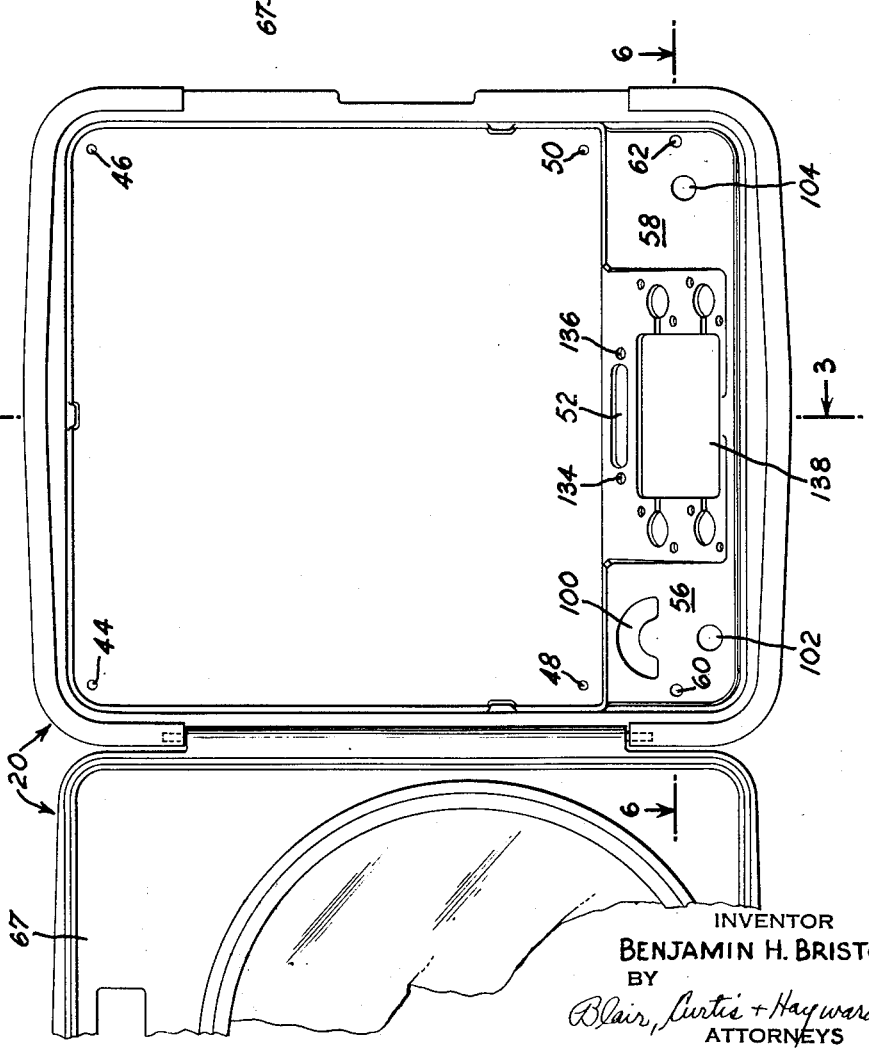
INVENTOR
BENJAMIN H. BRISTOL
BY
Blair, Curtis + Hayward
ATTORNEYS Nov. 7, 1950 B. H. BRISTOL 2,528,735
INSTRUMENT CASE CONSTRUCTION
Filed Aug. 21, 1946 4 Sheets-Sheet 3

INVENTOR
BENJAMIN H. BRISTOL
BY
Blair, Curtis & Hayward
ATTORNEYS

Nov. 7, 1950   B. H. BRISTOL   2,528,735
INSTRUMENT CASE CONSTRUCTION
Filed Aug. 21, 1946   4 Sheets-Sheet 4

INVENTOR
BENJAMIN H. BRISTOL
BY
Blair, Curtis & Hayward
ATTORNEYS

Patented Nov. 7, 1950

2,528,735

UNITED STATES PATENT OFFICE 2,528,735

INSTRUMENT CASE CONSTRUCTION

Benjamin H. Bristol, Foxboro, Mass., assignor to The Foxboro Company, Foxboro, Mass., a corporation of Massachusetts Application August 21, 1946, Serial No. 691,925

4 Claims. (Cl. 137—69)

This invention relates to instrument case constructions. More particularly it has to do with a type of construction especially useful for instruments such as those described and claimed, for example, in Philbrick Patent 2,360,889. Constructions embodying the invention comprise, essentially, a primary instrument housing and a secondary mechanism assembly which combine into a compact unit.

In the usual industrial use of instruments, such as in an oil refinery, the various indicating, recording and controlling mechanisms are arranged along a single instrument panel. The engineers and instrument operators ordinarily do little more than observe the charts and dials to make sure that the processes are proceeding as they should. The control instruments themselves are used to regulate valves and other devices throughout the plant. By means not forming a part of this invention each instrument is made sensitive to some condition, such as flow, level, pressure, temperature, etc., which is controlled by regulating a control valve. As an instrument mechanism reacts to a change in the controlled condition to which it is made responsive, it automatically makes a change in the setting of the control valve so as to maintain within desired limits the sensed condition.

As manufacturing knowledge has advanced, industrial processes have become more complicated. The control instruments and mechanisms used with the processes have correspondingly become more complicated; they have been made ever more accurate and responsive. In order to achieve and retain that degree of accuracy and response which is now essential to normal operation of many industrial processes the various control mechanisms have acquired a refinement of parts, movements and assemblies the functioning of which is not readily comprehended by even the most apt operators. Inevitably each control instrument must, from time to time, be cleaned and oiled and adjusted and calibrated. Because of the abstruse functionings of the instruments, the maintenance work can best be done and often can only be done by removing the instrument from its location in the panel board of the control room and returning it either to the laboratory of the plant maintenance department or to an instrument servicing agency in the community conducted by the manufacturer of the instrument where skillful men possessed of recondite knowledge are available.

The present invention will be described as applied to and embodied in a pneumatically operated temperature controller. The controller is equipped with a Bourdon tube the free end of which is made to move by a conventional thermal system in response to changes in temperature at a control location. Movements of the Bourdon tube are used to give an automatically regulated output air pressure which is employed in a known manner to regulate a control valve. Thus, if the temperature to be controlled tends to rise, the output pressure of the instrument effects a change in the setting of the control valve so as to decrease the amount of heat supplied to the control location and maintain its temperature constantly at a selected value.

It is to be observed that the setting of the same control valve might also be accomplished manually by means of a supply of compressed air and a pressure regulator with which hand adjustments can be made from time to time as needed to change the opening of the valve and thus compensate for variations in the temperature. And in practice the valve is so controlled during those periods when the control instrument for any reason is not operating or has been removed from the panel and taken to a laboratory for servicing. As pointed out above, occasional adjustments or repairs are necessary and in any large control room it would not be unusual to have at least one and possibly several of the instruments removed from their customary settings in the wall. During such times the control valves of the removed instruments are controlled manually.

In order to make manual control possible the piping systems which ordinarily are used for the automatic instrument must be altered so as to insert a manual pressure regulator into the air pressure line which leads to the control valve and through which the control output pressure of the instrument normally passes. In some plants it has been the practice to mount on the instrument panel a manual pressure regulator for each instrument opening so that the connections to the manual valve can be readily made when the automatic instrument is disconnected. This practice has the disadvantage not only of requiring time consuming panel drilling and preparation but also of wasting valuable panel space; in many plants panel space for this purpose is quite unavailable. And even in the most efficiently arranged plants it has been necessary when disconnecting an instrument not only to have in attendance an instrument man, but if the instrument was to be removed there had also to be present a pipe fitter or other plant maintenance man to perform the actual mechanics of disconnecting, rearranging and reconnecting the pipes so that the automatic instrument could be physically removed from the pneumatic circuit and the manual instrument put into operation. This continual adjustment, repair and replacement of these automatic instruments necessitates changes in fluid piping which have long been a source of annoyance to instrument users. A further disadvantage—sometimes not an apparent one—of previous instrument installations lay in the fact that sometimes the piping which was used to combine a manual control with the instrument introduced into the pneumatic circuit of the instrument changes of volume, rate of air flow, etc., which had not been contemplated by the instrument manufacturer and which inadvertently altered the operation of the instrument. My invention overcomes this disadvantage.

The present invention provides an instrument construction which makes possible for the first time easy installation or removal of a control instrument and easy switch-over to or from a manual pressure regulator. Thus, an instrument can be removed or installed without making changes in existing piping and the entire job can be done by an instrument man alone without many trips to the rear of the instrument panel and without resort to a pipe fitter or plant maintenance man.

It is an object of my invention to provide a device of the character described having to a notable extent the characteristics and capabilities above set forth. A further object is to provide an instrument case construction which overcomes the above-mentioned as well as other known disadvantages and which at the same time can be easily manufactured and put into operation. A further object resides in the provision of means whereby an instrument can be disconnected from operation, physically removed from the pneumatic circuit, and a manual pressure regulator substituted therefor all without necessitating a change in permanent piping. Yet another objective is the provision of an instrument construction and manual control combination whereby automatic and manual control mechanisms may be installed and placed in operation using only the piping system designed and provided by the instrument manufacturer. Other objects will be in part pointed out as the description proceeds and will in part become apparent therefrom.

The invention accordingly consists in the features of construction, combinations of elements, and arrangements of parts as will be exemplified in the structure to be hereinafter described, and the scope of the application of which will be set forth in the accompanying claims.

In the drawings, in which a single embodiment of the invention is shown:

Figure 2 is a view similar to that of Figure 1 showing the principal case member before other parts of the assembly are fitted into it;

Figure 3 is a sectional view taken along the line 3—3 of Figure 2;

Figure 1:
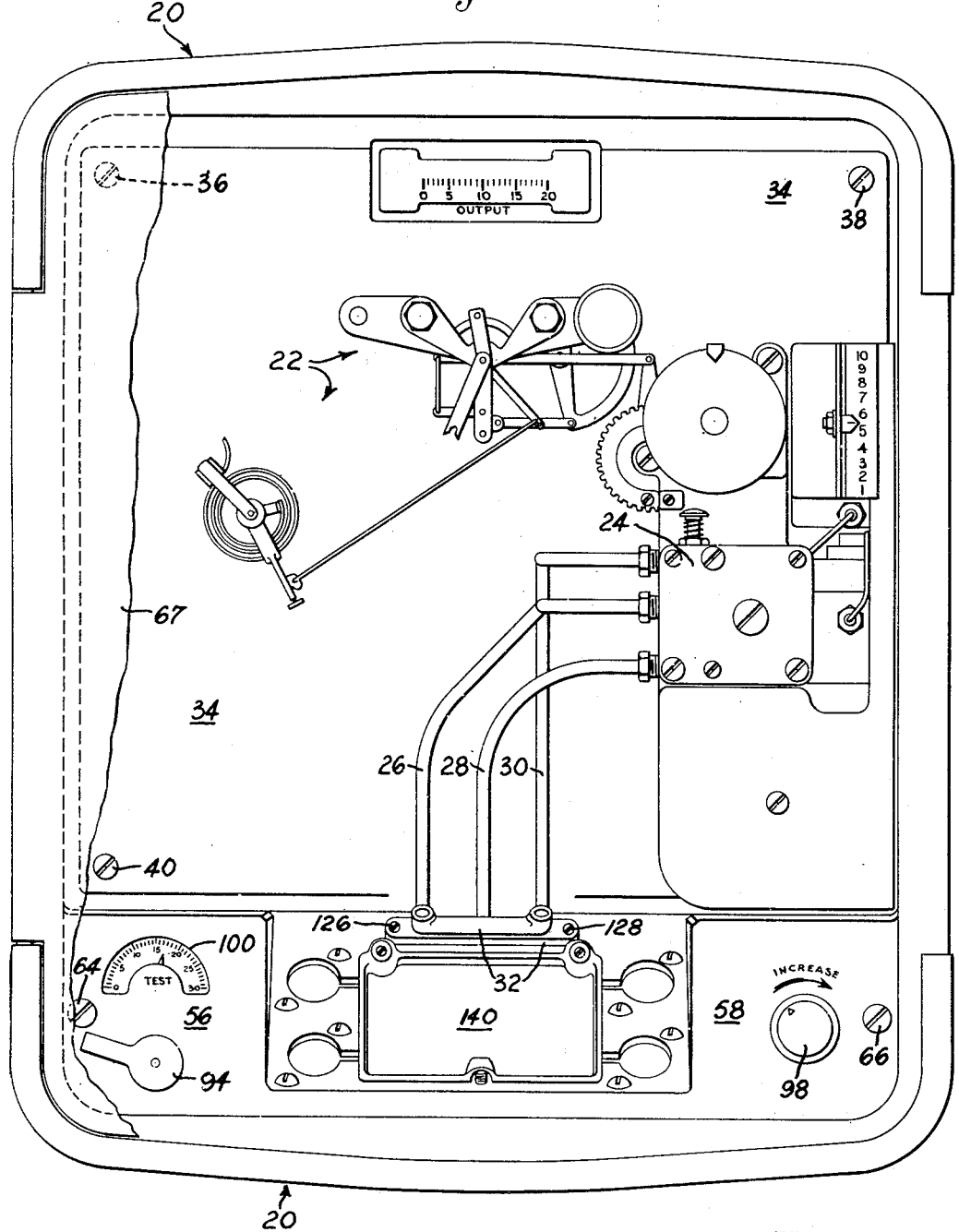
Figure 1 is a front elevation of a control instrument and case construction embodying the invention.
Figure 4:
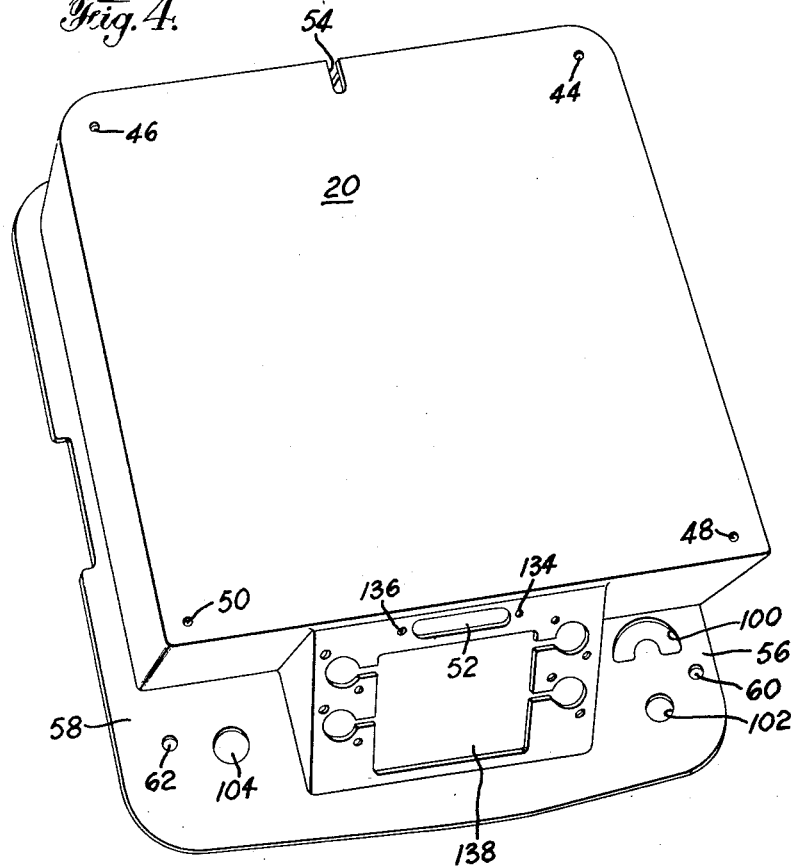
Figure 4 is a perspective view of the case shown in Figure 2 taken from the rear and from slightly below.

In Figure 1 a case 20 is illustrated. It houses an instrument control mechanism generally indicated at 22 and including a pneumatically operated relay valve 24. Pipes 26, 28 and 30 are each connected to the controller and respectively carry an air supply to the relay valve, an output pressure to an operating motor of the controller, and an operating pressure from the relay valve. The pipes at their lower ends terminate in a connection block 32. The instrument mechanism is mounted upon and carried by a rectangularly shaped plate 34 which covers a substantial portion of the interior of case 20 and which is removably secured therein by mounting screws, of which screws 36, 38 and 40 show in Figure 1. The case, stripped of its accessories, appears in Figure 2 where threaded holes 44, 46, 48 and 50 for reception of the plate mounting screws are visible. A connection block opening 52 also is shown in Figure 2. It is intended for use in conjunction with connection block 32 as will be described hereinafter. In Figure 4 as illustrated a fastening slot 54 in the upper rear central portion of the case for cooperating in a known manner with a mounting means operating against the back of the panel mounting; in certain installations the case can advantageously be mounted with top and side clamps of known design.

In the lower corners of the casing are shown case portions 56 and 58 (see also Figures 1 and 2). Portion 56 is provided with a case mounting hole 60 and portion 58 is provided with a case mounting hole 62 for reception of, respectively, case mounting screws 64 and 66 (see also Figure 1). A case cover is indicated at 67 (see Figures 2 and 6) hinged to case 20. When closed it covers not only plate 34 but also case portions 56 and 58.

Figure 5:
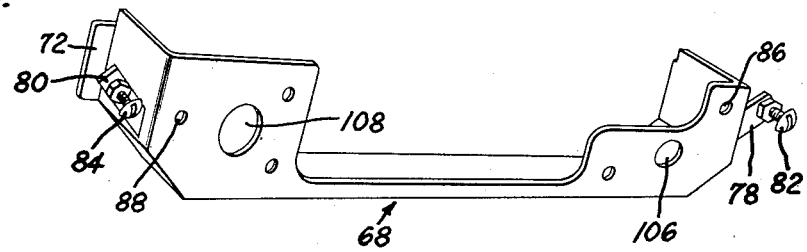
Figure 5 is a perspective view of a subcase member which is used in the invention.
Figure 6:
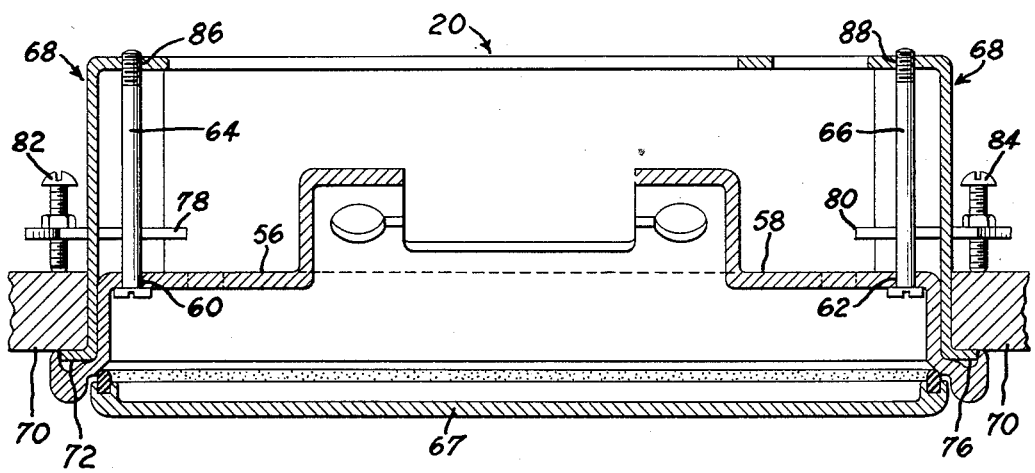
Figure 6 is a view similar to what a sectional view taken along the line 6—6 of Figure 2 would be, showing the case of Figure 2 and also the subcase of Figure 5 assembled together and positioned in a wall panel opening.

In Figure 5 a subcase 68 is shown and in Figure 6 subcase 68 appears in an opening in panel 70. The subcase includes front flanges 72, 74 and 76 which engage side and bottom edge portions of the panel opening and the subcase is clamped in the opening by means of corner clamps 78 and 80 (see also Figure 6) and clamp screws 82 and 84. In Figure 6 the method of assembly of the case with the subcase is illustrated wherein screws 64 and 66 engaging case 20 pass rearwardly into subcase 68 and are threaded into threaded holes 86 and 88. Thus subcase 68 is seen to be independently clamped within the panel opening and case 20 is removably secured in the opening by the slot construction 54 at its top and by a pair of screws 64 and 66 at its bottom threaded into subcase 68. For some installations there is advantage in providing case 20 with top and side clamps similar to the clamp construction here shown with subcase 68; the use of such clamps throughout enables the case to be clamped into the panel independently of the subcase—thus both case and subcase are directly supported by the panel and independently of each other.

Figure 7:
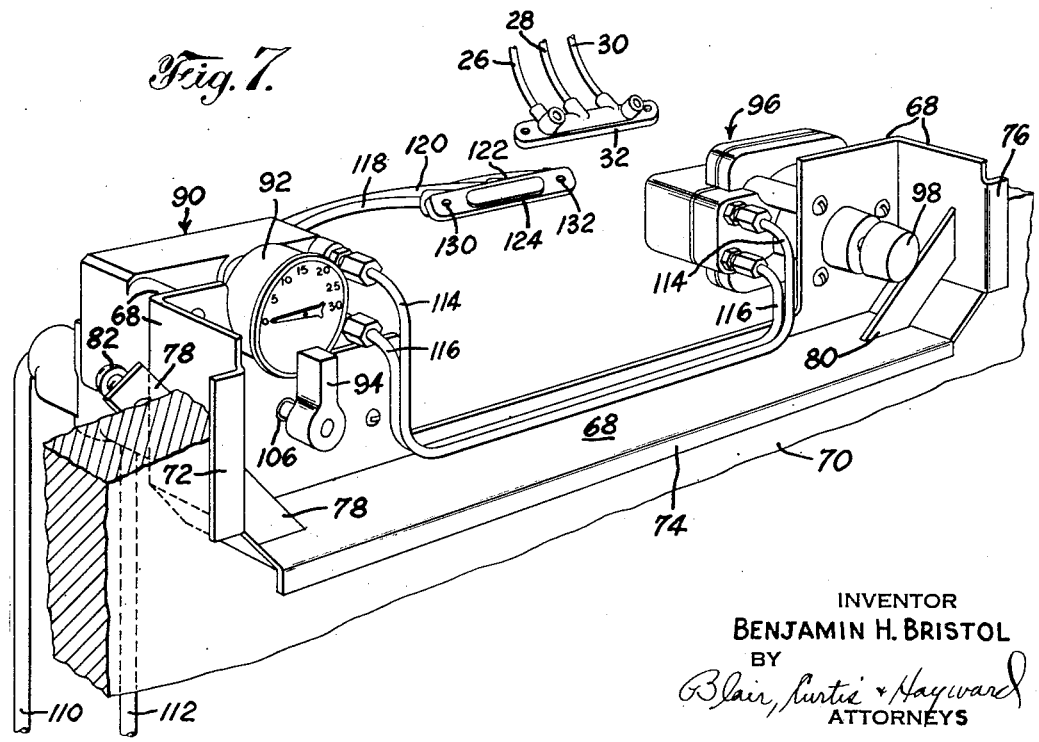
Figure 7 is a perspective view of the subcase of Figure 5 together with certain valve means with which it forms a unitary assembly.

In Figure 7 subcase 68 is shown with a transfer valve or switch 90 and a pressure indicator 92. A forwardly extending control knob 94 serves to operate the transfer switch from the front of panel 70. A pressure regulating valve 96 is secured to the rear right portion of subcase 68 with a forwardly extending control knob 98 for operation of the regulating valve from the front of the instrument. As shown in Figures 2 and 4, case portion 56 of case 20 includes a dial opening 100 and a knob opening 102; case portion 58 includes a knob opening 104. In Figure 5 subcase 68 is seen to be provided with a pair of knob openings 106 and 108. These openings facilitate the combination of subcase 68, transfer switch 90, pressure indicator 92 and pressure regulating valve 96, along with certain parts yet to be described, into a unitary assembly with the case portions 56 and 58 of case 20 to form the operative whole shown in Figure 1.

In Figure 7 an air pressure supply line 110 to the transfer switch appears with an air output pressure line 112 from the transfer switch. A pipe line 114 also conducts the air to pressure regulating valve 96 and a return pipe line 116 connects the manually regulated pressure from the regulating valve 96 to the transfer switch. Into the back of transfer switch 90 are connected three connection block pipes 118, 120 and 122 which lead to a connection block 124. Connection block 32 may be directly connected with connection block 124 by means of assembly screws 126 and 128 (see Figure 1) which pass through block 32 and thread into holes 130 and 132 (see Figure 7) in block 124. Case 20 is provided with case openings 134 and 136, giving clearance for screws 126 and 128, and with an opening 138 which facilitates certain assembly and disassembly operations. Opening 138 in the present embodiment is just large enough that the Bourdon tube thermal system may be disconnected from the instrument and passed through this opening and left at the panel wall when the automatic instrument is removed.

When the connection blocks are secured together pipe 118 is sealed to pipe 26, pipe 120 is sealed to pipe 28 and pipe 122 is sealed to pipe 30 so that three air-tight conduits are made between the transfer switch and controller 22. Opening 138 is normally covered with a plate 140 (see Figure 1). And so long as the case and subcase are secured together all of the automatic instrument mechanism plus the control knobs for the manual control mechanism are sealed within an imperforate housing to which access may be had only from the control room and through the dust-tight door. Thus the sealed mechanisms are protected from all atmospheric foreign matter during normal operation.

The details of the transfer switch of the fluid circuits through the connection blocks and of the controller 22 are fully described in the application of Hoel L. Bowditch, Serial No. 692,102, filed August 21, 1946, and for a complete knowledge of their operations reference may be had thereto; these details are not a part of nor essential to the construction of the present invention. The construction of the transfer switch is such that in one of its positions (commonly called "service position") the air supply is cut off from pipes 118, 120 and 122, and air pressure from the regulating valve 96 is connected to the output pressure pipe 112 to operate the control valve. With such a setting of transfer switch 90 the control valve may be manually positioned by adjustments to regulating valve 96 through knob 98. At the same time, with air supply to the controller cut off, and pipes 120 and 122 cut off, screws 126 and 128 may be loosened and connection blocks 32 and 124 disassembled. The thermal system may be disconnected from plate 34 and passed back through opening 138. Case mounting screws 64 and 66 may be backed off and the instrument case 20 and its mechanism removed from the opening in panel 70 and carried away. During the time that the main case is away the controlled valve may be regulated manually by adjustments through knob 98. No change has to be made in the piping, for the sub-case remains in place and its connections with the air supply and with the diaphragm motor operated by the controller remain intact. After the instrument mechanism within case 20 has been serviced it may be returned to its position in panel 70 and the connection blocks 32 and 124 reconnected by the instrument man without assistance from anyone else. When the air circuits have been reestablished the transfer switch can be shifted to another setting to restore the air supply to the controller. It is to be observed that all of the pipes, connection blocks, etc., of the pneumatic circuit which require disconnection or connection or alteration during the entire procedure are those pipes and connection blocks, etc., provided by the instrument manufacturer and matched by him to the pneumatic circuit involved so that no unforeseen or unintended circuit disruptions can occur.

Thus the embodiment described incorporates mechanism which occupies a single opening in a panel and which contains within itself all the parts necessary not only to control a process valve automatically but also to position the process valve by manual adjustments when the automatic instrument and its casing are absent, and all of the connections can readily be made by the instrument man alone and without changes in the fixed piping. Furthermore either case assembly is individually distinct and can be separately supplied or replaced and yet during ordinary working conditions the two combine into an airtight unit. And the various pneumatic circuits as calculated and balanced by the manufacturer are assured after installation in the field.

From the foregoing it will be observed that an instrument case construction embodying my invention is well adapted to attain the ends and objects hereinbefore set forth and to be economically manufactured, since the separate parts are well suited to common production methods and are subject to a variety of modifications as may be desirable in adapting the invention to different applications.

As many embodiments may be made of the above invention and as changes may be made in the embodiment above set forth, it is to be understood that all matter hereinbefore set forth or shown in the accompanying drawings is to be interpreted as illustrative and not in a limiting sense.

I claim:

1. In a pneumatically-operated controller including pneumatically-operated follow-up mechanism and a relay valve controlling a source of supply pressure to said follow-up mechanism to establish an output control pressure, in combination, a main case supporting therein the pneumatic follow-up mechanism and relay valve, a sub-case, fastening means detachably securing said main and sub-cases together as a unit, means for permanently securing said sub-case in an opening in a panel, said fastening means and sub-case serving to removably support said main case in said opening, a switching valve and a regulating valve supported in said sub-case, separate connections from said switching valve to a device operated by the output control pressure, to a source of air supply, to an intake port and to an output port of said regulating valve, to an intake port and to an output port of said relay valve, and to said pneumatic follow-up mechanism, said switching valve having a "run" position connecting said air supply pipe with the connection to said relay valve intake and connecting the connection from the said relay valve output with the connection to said follow-up mechanism and with the pipe connection to said device, and shutting off the connections to said regulating valve, and having a "servicing" position connecting said air supply connection with the connection to said regulating valve intake and connecting the connection from said regulating valve output with the connection to said device, and shutting off the connections to said relay valve and to said follow-up mechanism, detachable connecting means in the connections between said switching valve and said relay valve and follow-up mechanism whereby when said connecting means is detached and said switching valve is in servicing position said device may be operated by said regulating valve and said main instrument case may be detached from said sub-case and removed from said opening in said panel 2. Apparatus as claimed in claim 1 and wherein said detachable connecting means comprises a split manifold, one-half of which is secured with respect to said sub-case and the other half to said main case, and the connection from said relay valve and follow-up mechanism terminating in the half of said manifold secured with respect to said main case and the corresponding connection from said switching valve terminating at the half of said manifold secured with respect to said sub-case, and fastening means for detachably securing said manifold halves together.

3. Apparatus as claimed in claim 1 and wherein part of said main case is constructed and arranged to nest in said sub-case, and wherein said main case is provided with a dust-proof door covering the opening to said main case and to said sub-case.

4. Apparatus as claimed in claim 1 and wherein a part of the back of said main case is constructed and arranged to nest in said sub-case and is provided with openings through which said switching valve and regulating valve extend forwardly into said main case, and a dust-proof cover mounted on said main case to provide a dust tight enclosure for said follow-up mechanism, said switching valve, and said regulating valve.

BENJAMIN H. BRISTOL.

REFERENCES CITED

The following references are of record in the file of this patent:

UNITED STATES PATENTS

| Number | Name | Date |
|---|---|---|
| 1,372,600 | Cambelli | Mar. 22, 1921 |
| 2,098,914 | Gorrie | Nov. 9, 1937 |
| 2,311,853 | Moore | Feb. 23, 1943 |
| 2,369,887 | Eckman | Feb. 20, 1945 |